Dec. 18, 1928.
J. HAUSLER
1,695,549
ADJUSTABLE ARM REST FOR AUTOMOBILES
Filed May 13, 1927
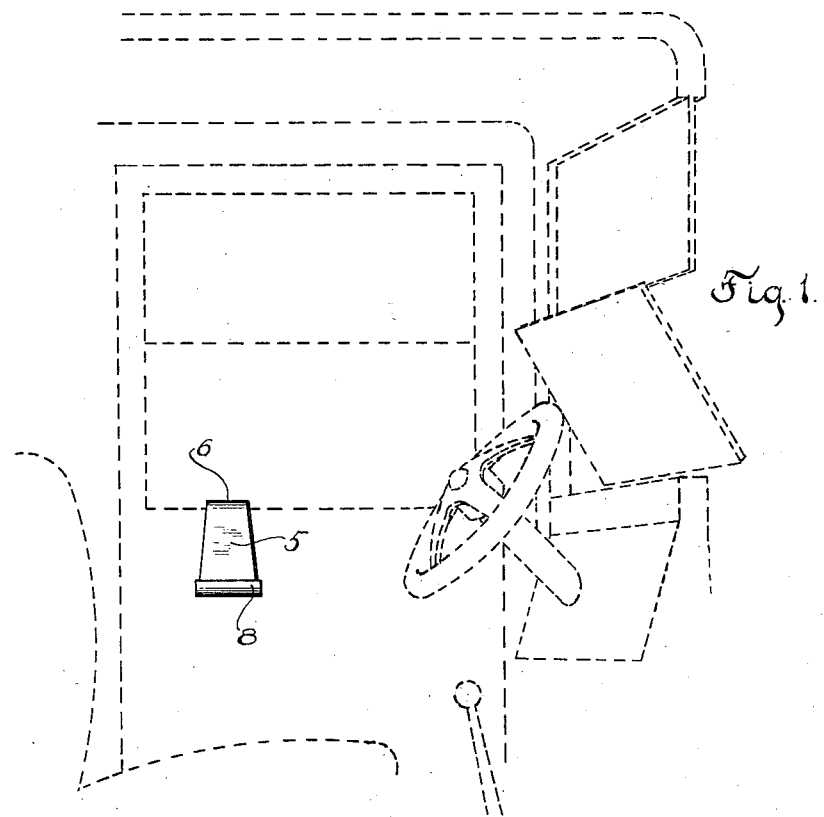
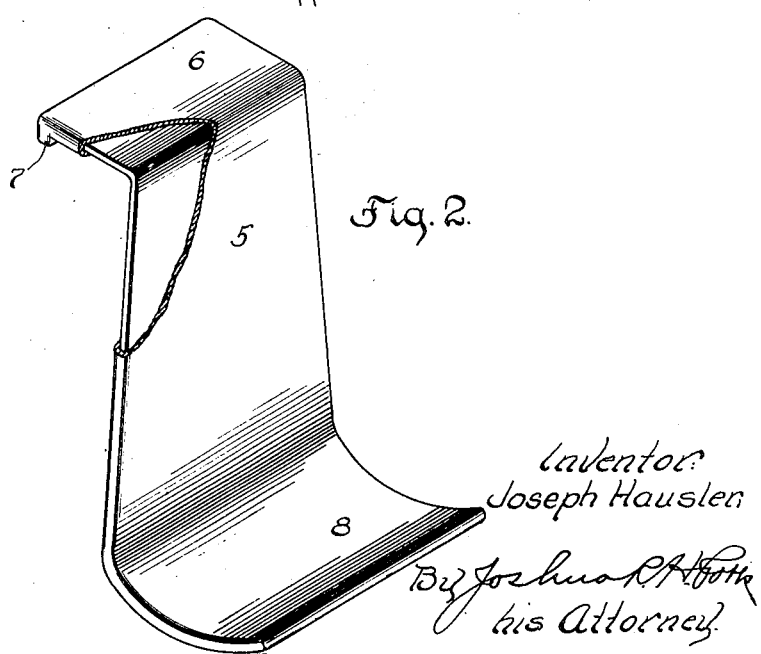
Witnesses
S. J. Collins
H. T. West.
Inventor:
Joseph Hausler,
By Joshua R. H. Potts
his Attorney Patented Dec. 18, 1928.

1,695,549

UNITED STATES PATENT OFFICE.

JOSEPH HAUSLER, OF CHICAGO, ILLINOIS.

ADJUSTABLE ARM REST FOR AUTOMOBILES.

Application filed May 13, 1927. Serial No. 190,991.

My invention relates to an improvement in arm rests for use in automobiles and the like, and has for its object the construction of an arm rest which may be moved from one part of an automobile to another, wherever needed for convenience.

A further object is to construct an arm rest which is removably attachable to the lower moulding of a window.

A still further object is to construct an arm rest which is especially convenient for the driver of an automobile, in which the window at the driver's left is too high to serve as an arm rest.

Other objects will appear hereinafter.

The invention consists in the combinations and arrangements of parts hereinafter described and will best be understood by reference to the accompanying drawing forming a part of this specification, and in which—

Figure 1 shows the arm rest attached to the window of an automobile adjacent the driver's seat.

Figure 2 represents a perspective view of the arm rest part of the cover being removed.

The preferred form of my invention as illustrated in the drawing, is constructed from a strip of sheet metal. From it I cut a piece of greater length than width and tapered toward one end. This strip of metal is bent at the tapering end at right angles to the main body 5 of the strip to form a section 6 and is again bent parallel with the portion 5 to form the flange 7. The parts 6 and 7 together form a hook which is of suitable size and shape to fit over the lower moulding of a window such as is usual in a closed car. The wider end of the strip is bent substantially at right angles to the portion 5 and in the opposite direction from the portion 6 to form the curved portion 8 which is of suitable size and shape to accommodate a human arm. The metal arm rest is then covered with any suitable soft material, preferably to match the upholstery of the automobile with which it is to be used.

In use the arm rest is hooked by means of the part 6 and 7 over any window moulding of the car and provides a support for the arm of the person sitting next to said window.

It will be seen that my invention is especially useful for the driver of an automobile.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. An arm rest formed of a strip of sheet metal of greater length than width tapered toward one end and bent to form a hook adapted to fit over the moulding of a window; the other end of said strip bent in the opposite direction to form a curved portion adapted to support the arm substantially as described.

2. An arm rest comprising a flat tapered body formed into a hook adapted to engage a window sill or the like at the narrow end and a shallow curved hook at the wide end adapted to support an arm substantially as described.

In testimony whereof I have signed my name to this specification.

JOSEPH HAUSLER.